US010262520B2

(12) United States Patent
Zhijian

(10) Patent No.: US 10,262,520 B2
(45) Date of Patent: Apr. 16, 2019

(54) METHOD USING A MOBILE COMPUTING DEVICE TO IMPROVE BLUETOOTH ANTI-LOST REMINDER IN PRECISE POSITIONING AND REMINDERING

(71) Applicant: Li Zhijian, Fujian (CN)

(72) Inventor: Li Zhijian, Fujian (CN)

( * ) Notice: Subject to any disclaimer, the term of this patent is extended or adjusted under 35 U.S.C. 154(b) by 0 days.

(21) Appl. No.: 15/798,658

(22) Filed: Oct. 31, 2017

(65) Prior Publication Data

US 2018/0061210 A1 Mar. 1, 2018

Related U.S. Application Data

(62) Division of application No. 15/132,654, filed on Apr. 19, 2016, now Pat. No. 9,865,153.

(30) Foreign Application Priority Data

Apr. 24, 2015 (CN) .............................. 201510200964

(51) Int. Cl.
*G08B 21/24* (2006.01)
*H04W 4/02* (2018.01)

(52) U.S. Cl.
CPC .............. *G08B 21/24* (2013.01); *H04W 4/02* (2013.01)

(58) Field of Classification Search
CPC ................................ G08B 21/24; H04W 4/02
See application file for complete search history.

(56) References Cited

U.S. PATENT DOCUMENTS

| 2013/0162389 A1* | 6/2013 | Crucs | G01P 13/00 340/3.1 |
|---|---|---|---|
| 2013/0249673 A1* | 9/2013 | Ferrari | G06Q 10/08 340/8.1 |
| 2014/0002239 A1* | 1/2014 | Rayner | G08B 13/1427 340/5.61 |
| 2014/0171132 A1* | 6/2014 | Ziemianska | H04M 3/436 455/466 |
| 2015/0359127 A1* | 12/2015 | Daoura | G06Q 10/00 320/101 |

* cited by examiner

*Primary Examiner* — Curtis B Odom
(74) *Attorney, Agent, or Firm* — Jennifer Meredith, Esq.; Meredith Attorneys, PLLC

(57) ABSTRACT

Systems and methods for precise location and tracking of a bag, wallet or luggage body. The system having a bag, wallet or luggage body having an anti-lost communication device attached to the bag, wallet or luggage body, the anti-lost communication device comprising a wireless communication device; and an application on a mobile computing device in communication with the wireless communication device, wherein the application issues a reminder on the mobile computing device when it determines the wireless communication device is a predetermined distance from the mobile computing device or the wireless communication device has lost communication with the mobile computing device.

19 Claims, 15 Drawing Sheets

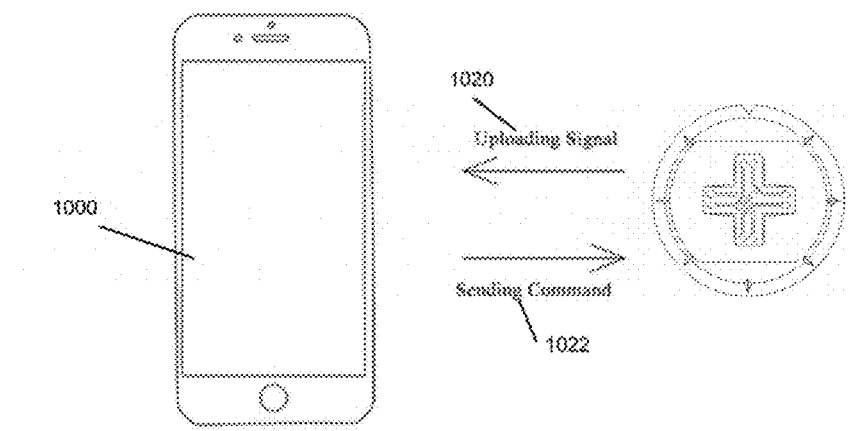
Figure 10
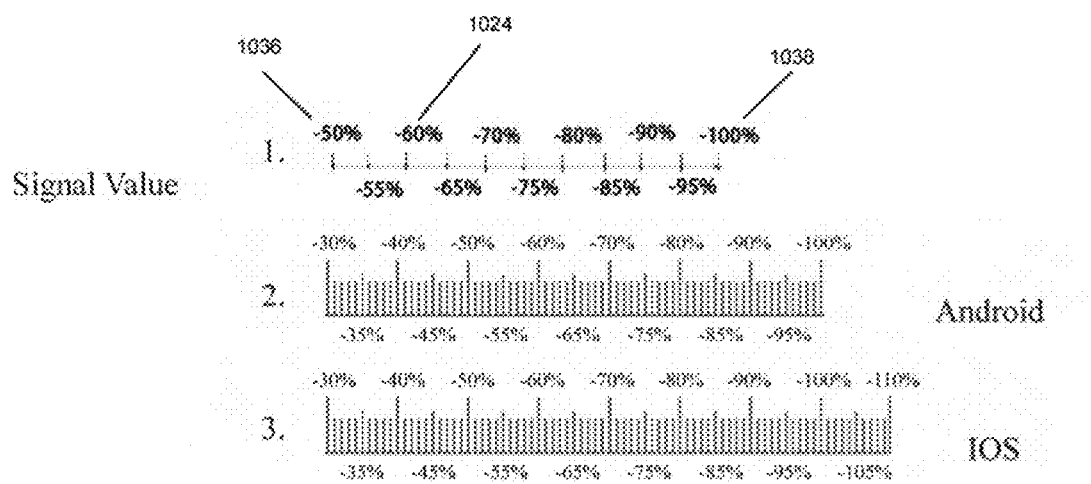
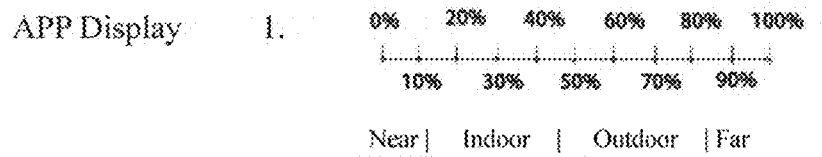
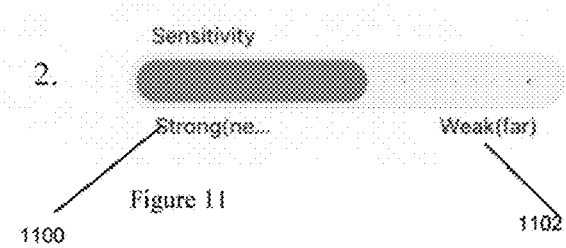
Figure 11

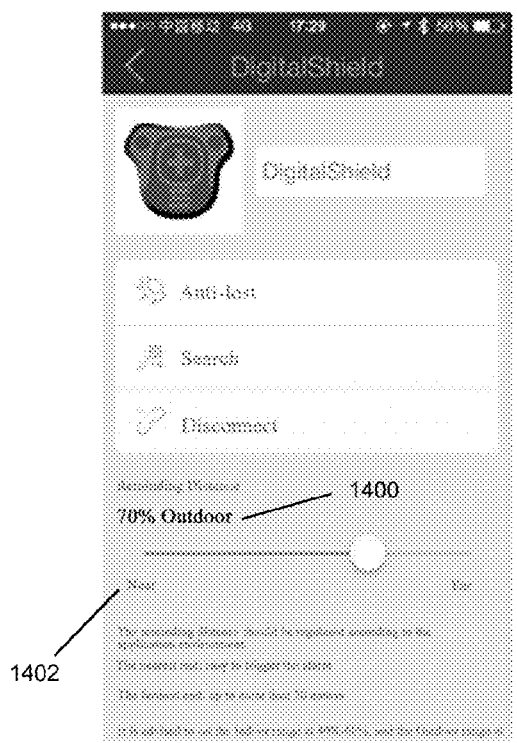 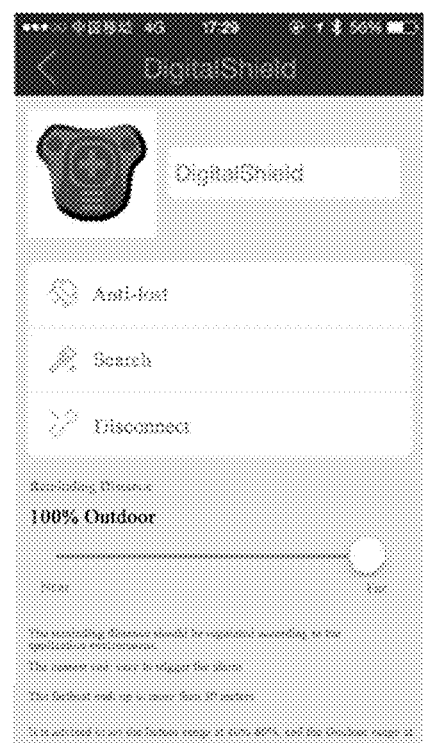
Figure 14                    Figure 15

FRONT SIDE

METHOD USING A MOBILE COMPUTING DEVICE TO IMPROVE BLUETOOTH ANTI-LOST REMINDER IN PRECISE POSITIONING AND REMINDERING

TECHNICAL FIELD

The disclosure relates to the technical field of communications, and in particular, to a method for positioning and searching for an article.

BACKGROUND ART

Bags or luggage have become a necessity in our everyday lives, such as backpacks (student backpacks, outdoor backpacks and so on), travel rod boxes, briefcases, lady handbags, shoulder bags and so on. With the continuous development of society, the human transportation is more convenient; as our portable devices, people have an increasing reliance on luggage or bags. However, when travelling with traditional luggage or bag, people often lose their luggage or bag due to carelessness or negligence, which will also bring many inconveniences and troubles in the work and life.

The present invention aims to overcome defects mentioned above, and provide a bag, wallet or luggage with an anti-lost reminding function, which enables that after a user leaves from the bag or luggage for more than, for example, a set distance or mobile computing device signal, the anti-lost reminder will immediately send out the reminder to remind the user during traveling, to achieve the anti-lost objective. The present invention also aims to provide a Bluetooth anti-lost reminder component which can be installed on various devices or articles that can be carried out, such as luggage, wallets, bags, umbrellas, tents, sleeping bags, coats or various other field equipment; after being bound with a Bluetooth device carried by the user, it can achieve the anti-lost function.

The loss of personal belongings is an unavoidable trouble of everyday life, and it is very difficult to find a lost article. The present invention uses a Bluetooth anti-lost reminder to realize the anti-lost function for articles. A Bluetooth anti-lost reminder is installed on an article, and then it is paired with and bound to the user's mobile phone. When the article goes beyond a predefined range, the mobile phone triggers an reminder to remind the user. It can prevent an article from being lost to a certain extent. The present invention also resolves the problem that the intensity of the Bluetooth signal is under the influence of the environment where the user is, such as a crowded entertainment venue indoor or outdoor; moreover, the technical characteristics of the Bluetooth device tend to cause great fluctuation of its signal value, typically among 10-20 different signal values. For example, the signal value received in a second before is −65%, but the signal value received in the second after might become −80%, so that it is difficult to compute its fixed value. The present invention adapts to different living environments indoor and outdoor, which has not been accomplished by the prior art.

BRIEF SUMMARY OF THE INVENTION

One aspect of the present invention provides a system for precise location and tracking of a bag, wallet or luggage body, the system comprising: a bag, wallet or luggage body having anti-lost communication device attached to the bag, wallet or luggage body, the anti-lost communication device comprising a wireless communication device; and an application on a mobile computing device in communication with the wireless communication device, wherein the application issues a reminder on the mobile computing device when it determines the wireless communication device is a predetermined distance from the mobile computing device or the wireless communication device has lost communication with the mobile computing device.

Another aspect of the present invention provides a method of tracking a luggage body in communication with a mobile computing device, the method comprising the steps of: searching for a wireless communication device that is attached to a bag, wallet or luggage body; connecting to the wireless communication device, reporting, by the wireless communication device, a signal within a preset time interval to a mobile computing device; receiving, by the mobile computing device, the signal and analyzing a value of intensity of the signal; setting a fixed signal value on the mobile computing device as a reference reminder value, wherein at least two continuous signal values reported by the wireless communication device and received at the mobile computing device exceed the reference reminder value, the mobile computing device will issue a reminder command on at least one of the mobile computing device and the wireless communication device.

BRIEF DESCRIPTION OF THE DRAWINGS

FIG. 10 is a schematic diagram of the connection between said mobile computing device of the disclosure and the Bluetooth anti-lost reminder.

FIG. 11 is a schematic diagram of the scale configured on the mobile computing device.

FIG. 14 is a schematic diagram of the scale configured on the mobile computing device when 70% Indoor is selected.

FIG. 15 is a schematic diagram of the scale configured on the mobile computing device when 100% Indoor is selected.

DETAILED DESCRIPTION OF THE INVENTION

Figure 25:
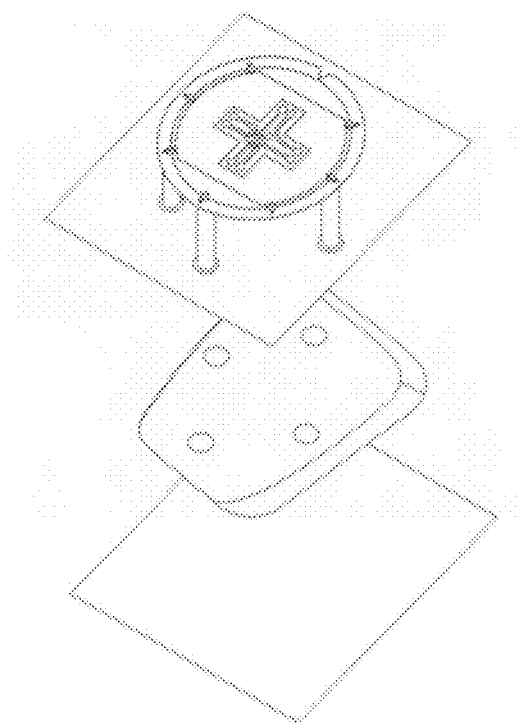
FIG. 25 depicts a Bluetooth anti-lost communication device according to another aspect of the present invention.

With references to FIGS. 1-25, the present invention provides a system for precise location and tracking of a bag, wallet or luggage body (1). The term bag, wallet or luggage body can include any item a user carries. This includes, but is not limited to a bag, wallet, luggage, umbrellas, tents, sleeping bags, coats or various other field equipment. The system, according to one embodiment, may be comprising: a bag, wallet or luggage body (1) having anti-lost communication device (100) attached to the bag, wallet or luggage body (1), the anti-lost communication device (100) comprising a wireless communication device (2); and an application (1002) on a mobile computing device (1000) in communication with the wireless communication device (2), wherein the application issues a reminder on the mobile computing device when it determines the wireless communication device (2) is a predetermined distance from the mobile computing device or the wireless communication device (2) has lost communication with the mobile computing device (1000). There may be a base (3) attached to the bag, wallet or luggage body (1), the base (3) having a recess (31) that receives the wireless communication device (2), a rear cover (32) that contains the wireless communication device (2) in the recess (31), a movable button (33) on the front of the base (3), a switch button (21) of the wireless communication device (2) is correspondingly disposed below the movable button (33) of the base (3). The anti-lost communication device (100) may be attached to the bag, wallet or luggage body by sewn stitches. FIG. 25 depicts the anti-lost communication device being attached by sewn stitches. The reminder on the mobile computing device may be, for example, any alarm, lights, flicker and/or vibration. The reminder may also be any combination of alarms, lights, flickers and/or vibrations. After the reminder is issued, it may be reset by shaking (1010) the mobile computing device. The application on the mobile computing device may also have a do not disturb (1006) button that prevents an reminder from being issued. The do not disturb button is set for a do not disturb length of time that prevents the reminder from being issued for the do not disturb length of time. The application may have a shutdown function (1012) that remotely powers down the wireless communication device (2) and/or a turn-on function (1012) that remotely powers up the wireless communication device (2). The wireless communication device may be a bluetooth device, bluetooth sensor, Bluetooth LE sensors, antennas, WiFi, cell signal detection, radio frequency sensors, cell signal detection on LTE, cell signal detection on GSM, Wideband Code Division Multiple Access (WCDMA), Code Division Multiple Access (CDMA), wireless local area network (WLAN), Global Positioning System (GPS) and Ultra wide band (UWB).

The base (3) may be part of a nameplate (11) or a decorative part (13) mounted on the bag or luggage body (1). According to another embodiment, the base (3) may be mounted inside a handle (12) of the luggage body (1), a button hole (121) is provided on the handle (12) and the movable button (33) is exposed to outside of the button hole (121). According to another embodiment, the base (3) is mounted inside the handle (12) of the luggage body (1), a button indicator (122) is provided on the handle (12) and the movable button (33) is built in the bottom of the button indicator (122). According to another embodiment, the base (3) is mounted on a shoulder strap (14) of the luggage body (1), or mounted inside a surface base (15) of a USB charging outlet of the shoulder strap (14). The base (3) may be made from a flexible material. The recess (31) and rear cover (32) may be locked by the way of screw thread matching, or matched to lock by the way of fastening a buckle.

The application (1002) may have a sensitivity adjustment (1004) and controls (1008) for the wireless communication device, and the application may issue a reminder on the mobile computing device when it determines the wireless communication device (2) is a predetermined distance, as set by the sensitivity adjustment, from the mobile computing device. The application (1002) may have a distance adjustment (1402) and controls (1008) for the wireless communication device, and the application may issue a reminder on the mobile computing device when it determines the wireless communication device (2) is a predetermined distance, as set by the distance adjustment, from the mobile computing device. The application (1002) may have a signal strength adjustment (1100 and 1102) and controls (1008) for the wireless communication device, and the application issues a reminder on the mobile computing device when it determines the wireless communication device (2) is a predetermined signal strength, as set by the strength adjustment, from the mobile computing device. The application (1002) may have an indoor and outdoor adjustment (1300 and 1400) and controls (1008) for the wireless communication device, and the application may issue a reminder on the mobile computing device when it determines the wireless communication device (2) is a predetermined signal strength, as set by the indoor and outdoor adjustment, from the mobile computing device.

The present invention also provides a method of tracking a luggage body in communication with a mobile computing device, the method comprising the steps of: searching for a wireless communication device (2) that is attached to a bag, wallet or luggage body (1); connecting (1014) to the wireless communication device (2), reporting, by the wireless communication device (2), a signal (1020) within a preset time interval to a mobile computing device (1000); receiving, by the mobile computing device (1000), the signal (1020) and analyzing a value of intensity of the signal; setting a fixed signal value (1024) on the mobile computing device (1000) as a reference reminder value, wherein at least two continuous signal values reported by the wireless communication device (2) and received at the mobile computing device (1000) exceed the reference reminder value, the mobile computing device (1000) will issue a reminder command (e.g. 1022) on at least one of the mobile computing device (1000) and the wireless communication device (2). The preset time interval of signal reporting, may be, for example, between 0.1 and 3 seconds.

The reminder command may indicate the bag, wallet or luggage body (1), is further than a predetermined distance from the mobile computing device (1000), as measured by the fixed signal value (1024). There may be an application (1002) on the mobile computing device (1000) which issues a reminder on the mobile computing device (1000) when it determines that the wireless communication device (2) is a predetermined distance from the mobile computing device (1000). The reminder may be reset by shaking the mobile computing device. The reminder may be reset by accepting an input in the application. The reminder may be reset by shaking the bag, wallet or luggage body (1). The reminder may be reset by accepting an input on a button on the wireless communication device. For example, a user may press a button on the mobile computing device (also referred to as a wireless communication device).

The application on the mobile computing device has a do not disturb button that prevents a reminder from being issued. The do not disturb button may be set for a do not disturb length of time that prevents the reminder from being issued for the do not disturb length of time. There may be an application on the mobile computing device, wherein the application has a shutdown function that remotely powers down the wireless communication device (2). The application may have a turn-on function (1012) that remotely powers up the wireless communication device (2). The wireless communication device may be selected from the group consisting of a bluetooth device, bluetooth sensor, Bluetooth LE sensors, antennas, WiFi, cell signal detection, radio frequency sensors, cell signal detection on LTE, cell signal detection on GSM, WCDMA, CDMA, WLAN, GPS and UWB.

The mobile computing device may select three continuous signal values reported from the wireless communication device for comparison, and issues a reminder command when all of the three signal values exceed the reference reminder value. The reference reminder value may be regulated with a scale. The reference reminder value may be regulated by input in the application. The mobile computing device may be reset and start counting again once there is at least one of the continuous signal values reported from the wireless communication device not exceeding the reference reminder value. There may be a distance regulation scale on the mobile computing device, wherein a near end of the distance regulation scale on the mobile computing device is configured as an indoor mode (1200) and a far end as an outdoor mode (1400).

An application (1002) on the mobile computing device may have a sensitivity adjustment (1004) and controls (1008) for the wireless communication device, and the application issues a reminder on the mobile computing device when it determines the wireless communication device (2) is a predetermined distance, as set by the sensitivity adjustment, from the mobile computing device. An application (1002) on the mobile computing device may have a distance adjustment (1402) and controls (1008) for the wireless communication device, and the application issues a reminder on the mobile computing device when it determines the wireless communication device (2) is a predetermined distance, as set by the distance adjustment, from the mobile computing device. An application (1002) on the mobile computing device may have a signal strength adjustment (1100 and 1102) and controls (1008) for the wireless communication device, and the application issues a reminder on the mobile computing device when it determines the wireless communication device (2) is a predetermined signal strength, as set by the strength adjustment, from the mobile computing device. An application (1002) on the mobile computing device may also depict the GPS location, on a map, of the a bag, wallet or luggage body (1).

There may be a movable button (33) and a switch button (21) of the wireless communication device (2) correspondingly disposed below the movable button (33), wherein upon the movable button being pressed the application directs the mobile phone to open a photographing application on the mobile computing device and upon the movable button being pressed again a photo is taken on the mobile computing device. There may be a movable button (33) and a switch button (21) of the wireless communication device (2) correspondingly disposed below the movable button (33), wherein upon the movable button being pressed the application directs the mobile phone to ring as an alarm.

The present invention provides methods using a mobile computing device to improve the Bluetooth anti-lost reminder in precise positioning and remindering, comprising, for example: Step 1: the mobile computing device searches for the Bluetooth anti-lost reminder, and then is connected to and bound with the Bluetooth anti-lost reminder; Step 2: the Bluetooth anti-lost reminder reports a signal within the preset time interval; Step 3: the mobile computing device receives the signal reported from the Bluetooth anti-lost reminder, and analyzes for the value of its intensity to make a judgment; Step 4: a fixed signal value is set on the mobile computing device as the reference reminder value, and when at least two continuous signal values, which are reported from the Bluetooth anti-lost reminder and received at the mobile computing device, exceed the reference reminder value, the mobile computing device will give an reminder command to the equipment; and Step 5: an reminder is triggered at both the mobile computing device and the Bluetooth anti-lost reminder, indicating that the mobile computing device or the Bluetooth anti-lost reminder is out of the safe distance.

According to one embodiment, in Step 4, the mobile computing device selects three continuous signal values reported from the Bluetooth anti-lost reminder for comparison, and gives an reminder command when all of the three signal values exceed the reference reminder value. In Step 4, the reference reminder value may be set in such a way that the reminder distance is regulated with a scale. The scale may comprise the distance regulation scale and the signal value scale on the mobile computing device; for the distance regulation scale, the minimum scale mark 0% is at the left end, and the maximum scale mark 100% at the right end; for said signal value scale, the −50% scale mark is at the left end, and the −100% scale mark at the right end; and the scale marks of said distance regulation scale and said signal value scale are configured as being mutually corresponding from the left end to the right end. In Step 4, the mobile computing device may be reset and start counting again once there is any one of the continuous signal values reported from the Bluetooth anti-lost reminder not exceeding the reference reminder value. The near end of the distance regulation scale on said mobile computing device may be configured as the indoor mode, and the far end as the outdoor mode; wherein the 0-50% range is configured as the indoor mode, and the 50-100% range as the outdoor mode. In Step 2, the preset time interval of signal reporting may be, for example, one second.

Some advantages of the disclosure are as follows: applying the method of the disclosure, using the mobile computing device to improve the Bluetooth anti-lost reminder in precise positioning and remindering, is able to realize the positioning and remindering functions for the Bluetooth anti-lost reminder and the mobile computing device more precisely, and to avoid any false reminder or missing reminder caused from the frequent fluctuation of the Bluetooth signal. In addition, a two-scale mode is adopted in such a way that the two scales are mutually corresponding, which can effectively adapt to the influence of different environments such as a crowded entertainment venue indoor or outdoor, and make better performance on the Bluetooth anti-lost function for the user's article.

The user may start the control application (APP) on the mobile computing device (1000) (mobile phone), enable the Bluetooth function of the mobile phone and connect the mobile phone to the Bluetooth anti-lost reminder (anti-lost communication device (100), then the Bluetooth anti-lost reminder reports a signal to the mobile phone per second. When the mobile phone receives the signal, the built-in software of the APP on the mobile computing device is used to analyze the value of the signal intensity reported from the device for judgment, for which the mobile APP would take into consideration three signals reported from the Bluetooth anti-lost reminder. Taking FIG. 2 as an example, the icon of the distance regulation scale of the mobile APP is set at 50%, and the corresponding value of signal intensity at the signal value scale is −75%; when the mobile APP detects three continuous signal values reported from the Bluetooth anti-lost reminder exceed −75%, it will promptly give an reminder command to the Bluetooth anti-lost reminder, and an reminder is triggered at both the mobile computing device and the Bluetooth anti-lost reminder, indicating that the user's mobile phone or the Bluetooth anti-lost reminder is out of the safe distance.

In order to reduce the probability of false reminder, the mobile APP is specially configured to take three continuous signal values exceeding the preset reference value before responding. This is because that there is great fluctuation of the characteristic signal value of Bluetooth, typically among 10-20 different signal values. For example, the signal value received in the second before is −65%, but the signal value received in the second after might become −80%, so that it is difficult to compute its fixed value. According to the conclusion of multiple experiments, it is necessary to take three continuous signal values for reference. Taking FIG. 2 as an example, the icon of the distance regulation scale of the mobile APP is set at 50%, and the corresponding value of signal intensity at the signal value scale is −75%; there must be three continuous signal values reported from the Bluetooth anti-lost reminder exceeding −75% before an reminder is triggered; the software will be reset and start counting again once there is any one of the continuous signal values not exceeding −75%.

The intensity of the Bluetooth signal is under the influence of the environment where the use is, such as a crowded entertainment venue indoor or outdoor. Based on a series of piloting and studies, a scaled-based distance regulation function is developed, which adapts to different living environments indoor and outdoor, in which the reference reminder value is set in such a way that the reminder distance is regulated with a scale, the 0-50% range is configured as the indoor mode, and the 50-100% range as the outdoor mode. Said scale comprises the distance regulation scale and the signal value scale on the mobile computing device; for said distance regulation scale, the scale marks is set from the minimum mark 0% to the maximum mark 100%; for said signal value scale, the scale marks is set from the minimum mark 50% to the maximum mark 100%; and the scale marks of said distance regulation scale and said signal value scale are configured as being mutually corresponding from the minimum mark to the maximum mark.

The disclosure relates to a method using a mobile computing device to improve the Bluetooth anti-lost reminder in precise positioning and remindering, which comprises: Step 1: the mobile computing device searches for the Bluetooth anti-lost reminder, and then is connected to and bound with the Bluetooth anti-lost reminder; Step 2: the Bluetooth anti-lost reminder reports a signal to the mobile phone per second; Step 3: the mobile computing device receives the signal reported from the Bluetooth anti-lost reminder, and analyzes for the value of its intensity to make a judgment; Step 4: a fixed signal value is set on the mobile computing device as the reference reminder value, and when at least two continuous signal values, which are reported from the Bluetooth anti-lost reminder and received at the mobile computing device, exceed the reference reminder value, the mobile computing device will give an reminder command to the equipment; and Step 5: an reminder is triggered at both the mobile computing device and the Bluetooth anti-lost reminder, indicating that the mobile computing device or the Bluetooth anti-lost reminder is out of the safe distance. Applying the disclosure is able to realize the positioning and remindering functions for the Bluetooth anti-lost reminder and the mobile computing device more precisely, and to avoid any false reminder or missing reminder caused from the frequent fluctuation of the Bluetooth signal, which can effectively adapt to the influence of different environments such as a crowded entertainment venue indoor or outdoor, and make better performance on the Bluetooth anti-lost function for the user's article.

The present invention enjoys many advantages, including but not limited to: (1) The bag or luggage with a Bluetooth anti-lost reminder provided by the disclosure enables that after a user leaves from the bag or luggage for more than a setting distance, the anti-lost reminder will immediately sent out the reminder to remind the user during traveling, to avoid the loss of the bag or luggage due to the carelessness or negligence of the user. (2) The Bluetooth anti-lost reminder component provided by the disclosure has an ingenious fixed part and external button structure, which makes that the Bluetooth anti-lost reminder component can be easily installed on various devices or articles that can be carried out, such as luggages or bags, umbrellas, tents, sleeping bags, coats or various other field equipment; after being bound with a Bluetooth device carried by the user, it can achieve the anti-lost function.

Figure 1:
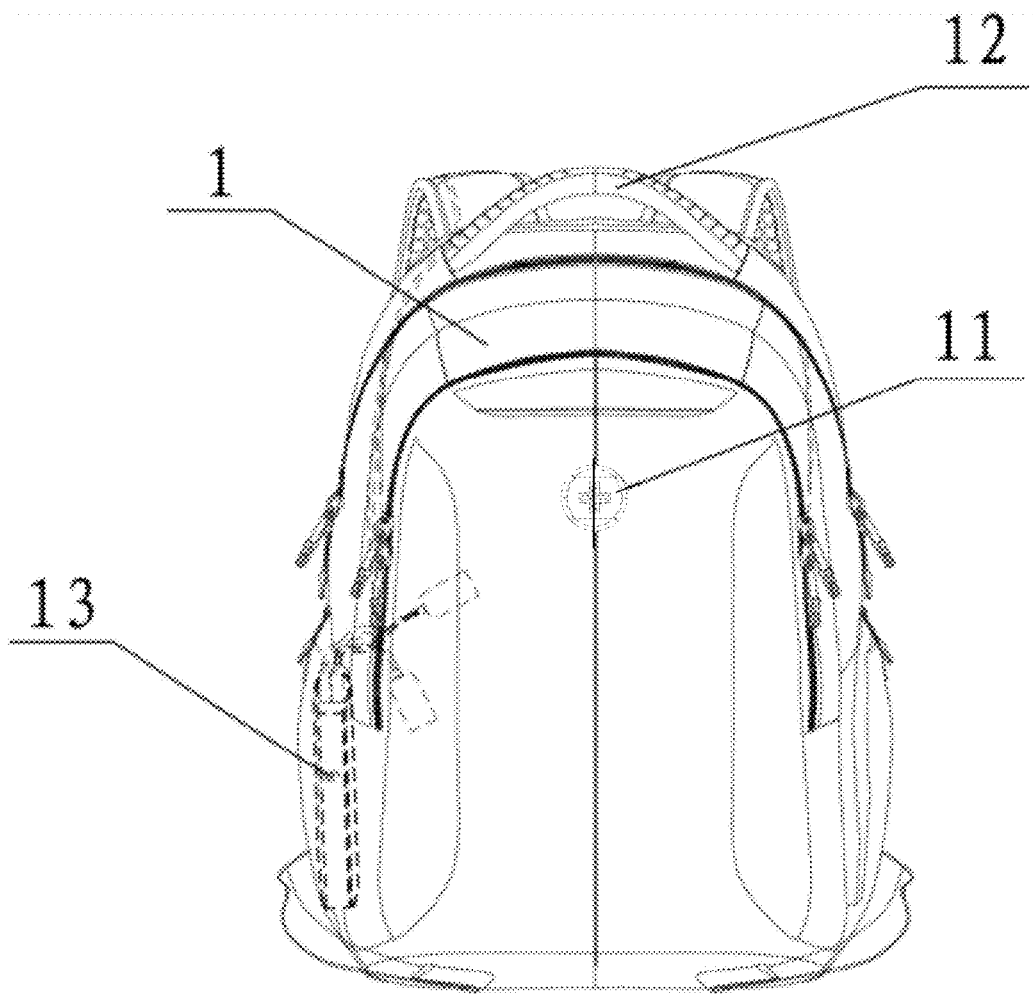
FIG. 1 is an overall structure schematic diagram of the present invention.
Figure 2:
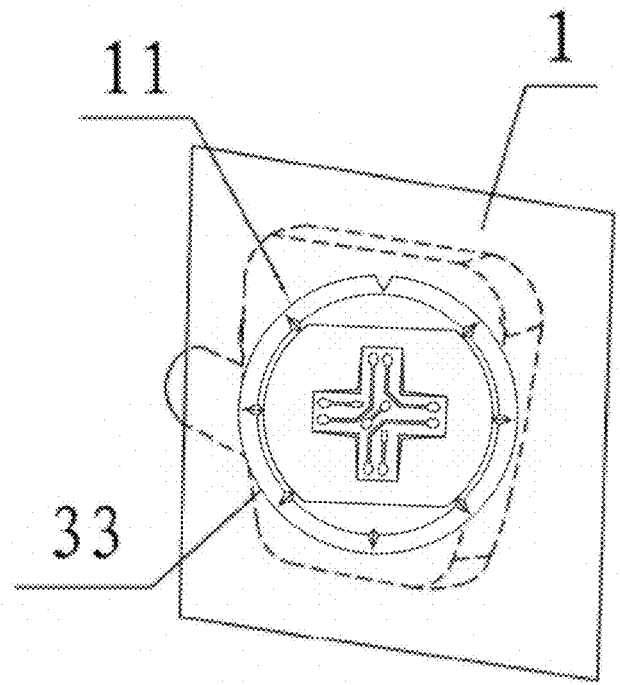
FIG. 2 is a front view of a Bluetooth anti-lost communication device according to one aspect of the present invention.
Figure 3:
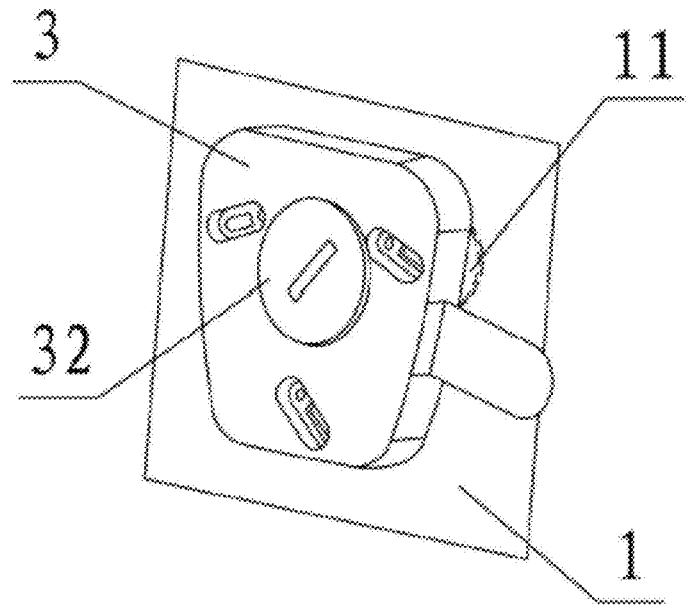
FIG. 3 is a rear view of a Bluetooth anti-lost communication device according to one aspect of the present invention.
Figure 4:
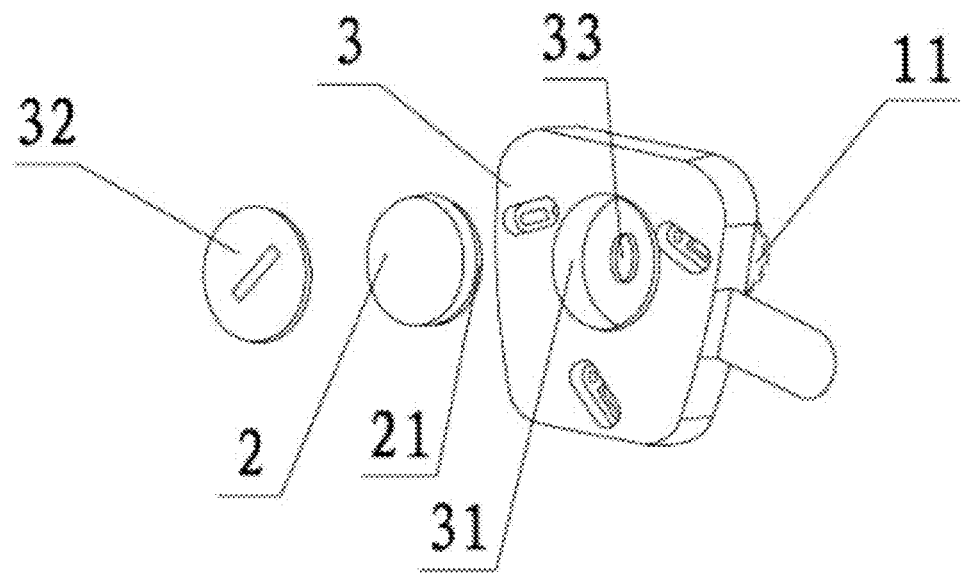
FIG. 4 is an exploded view of a Bluetooth anti-lost communication device according to one aspect of the present invention.
Figure 5:
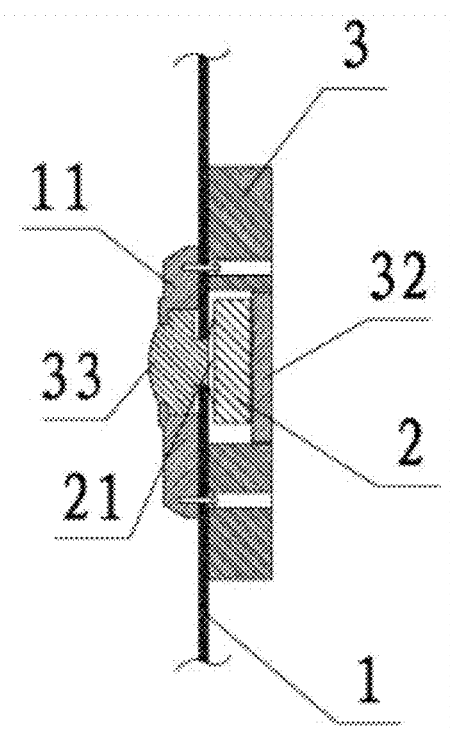
FIG. 5 is a section side view of a Bluetooth anti-lost communication device according to one aspect of the present invention.
Figure 6:
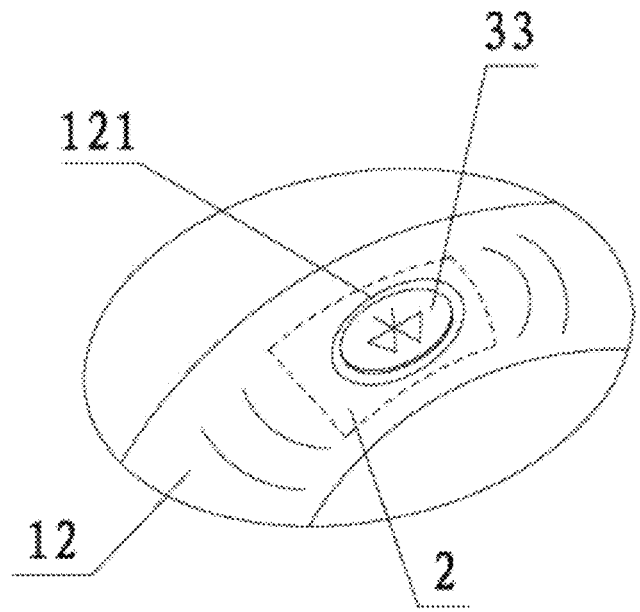
FIG. 6 is front view of a Bluetooth anti-lost communication device according to another aspect of the present invention.
Figure 7:
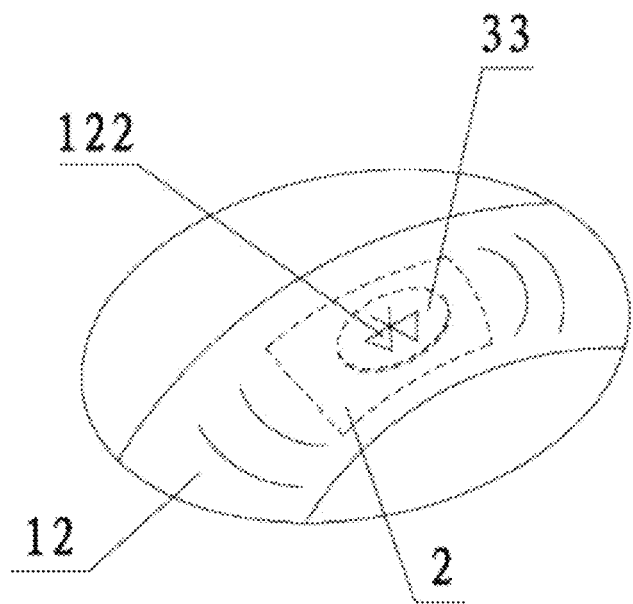
FIG. 7 is front view of a Bluetooth anti-lost communication device according to another aspect of the present invention.
Figure 8:
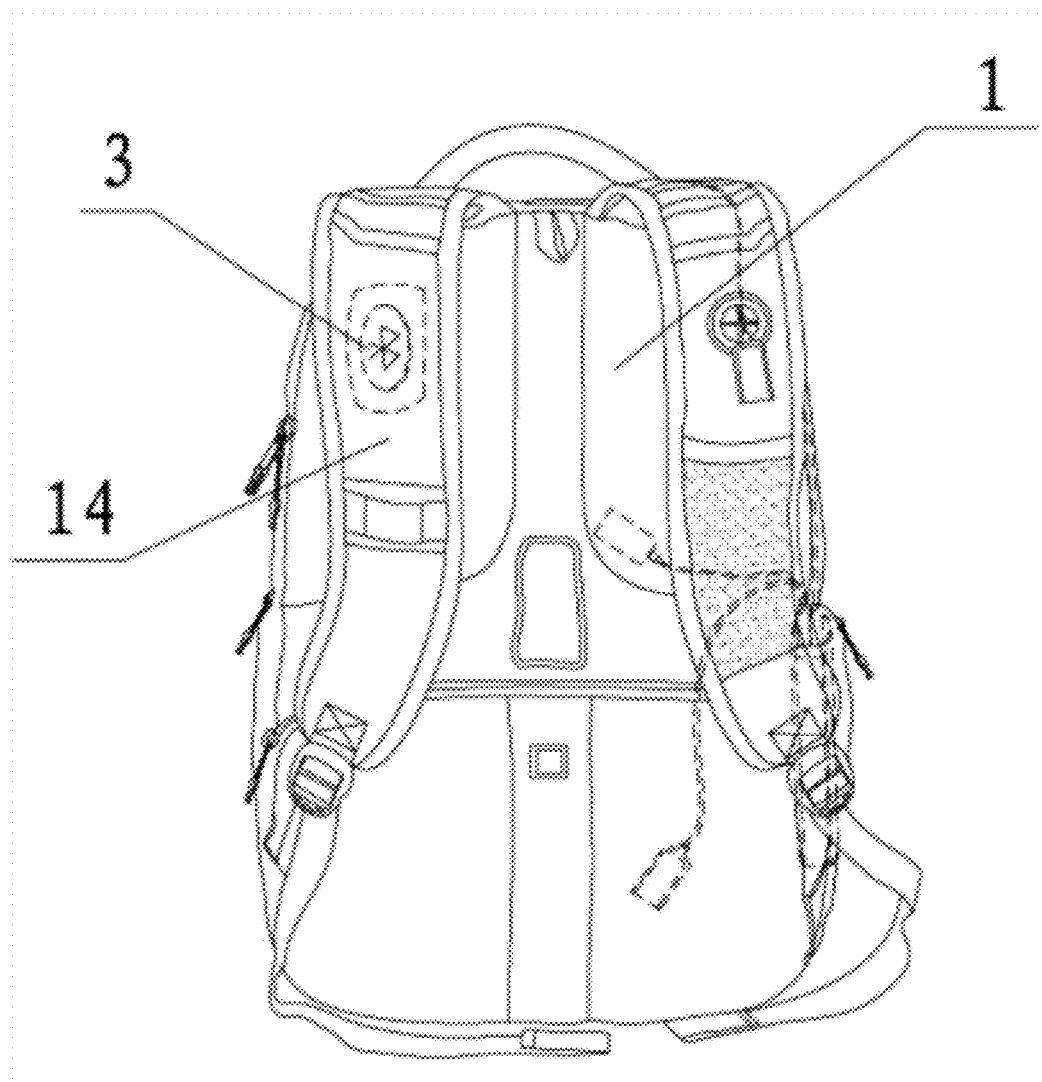
FIG. 8 is rear view of a luggage body according to one aspect of the present invention.
Figure 9:
FIG. 9 is an installation structure schematic diagram of the Bluetooth anti-lost communication device according to another aspect of the present invention.
Figure 12:
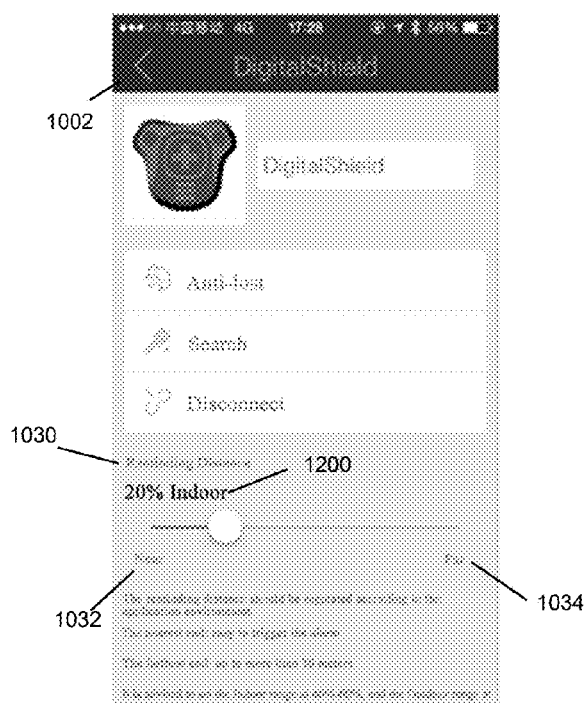
FIG. 12 is a schematic diagram of the scale configured on the mobile computing device when 20% Indoor is selected.
Figure 13:
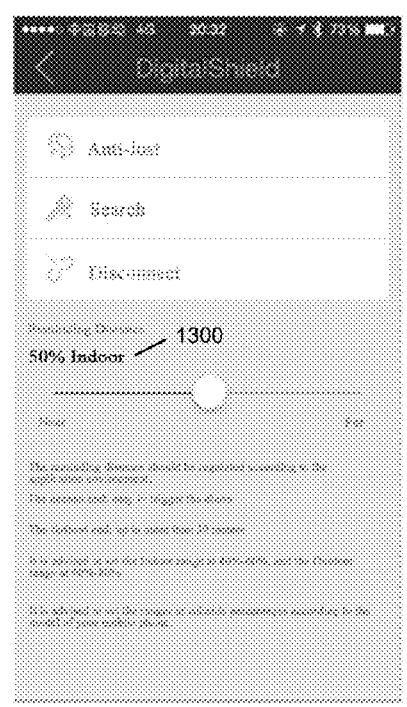
FIG. 13 is a schematic diagram of the scale configured on the mobile computing device when 50% Indoor is selected.
Figure 16:
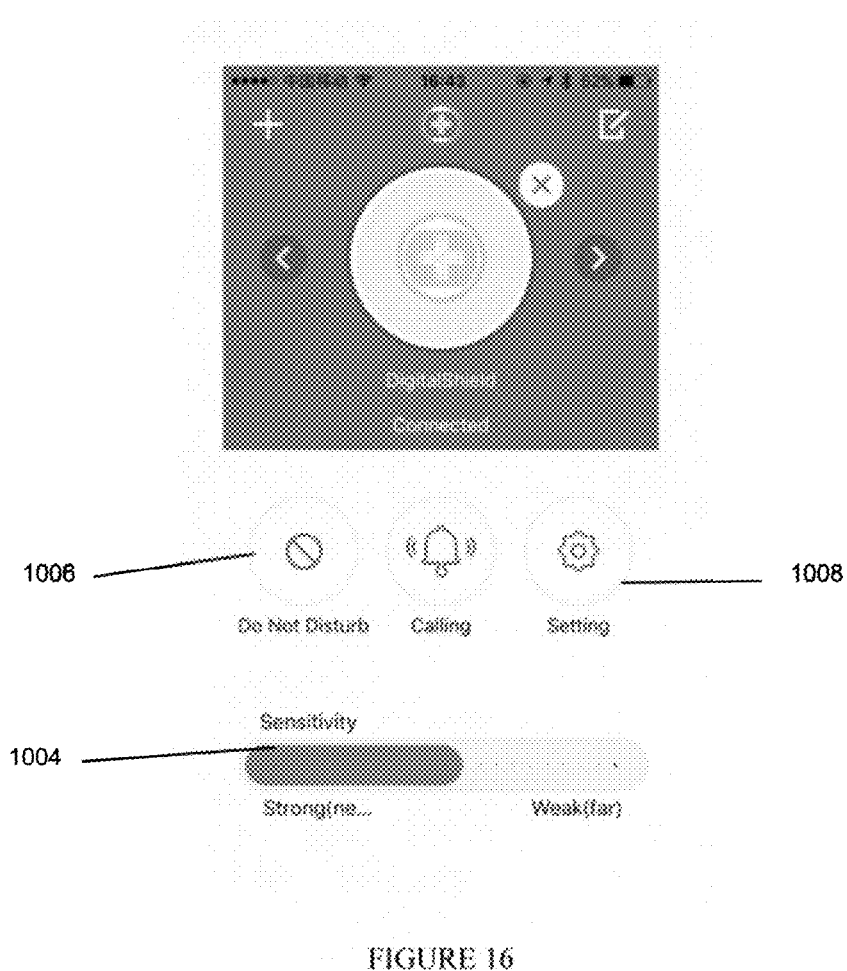
FIG. 16 depicts a screenshot of an application showing a sensitivity adjustment and other aspects of the present invention.
Figure 17:
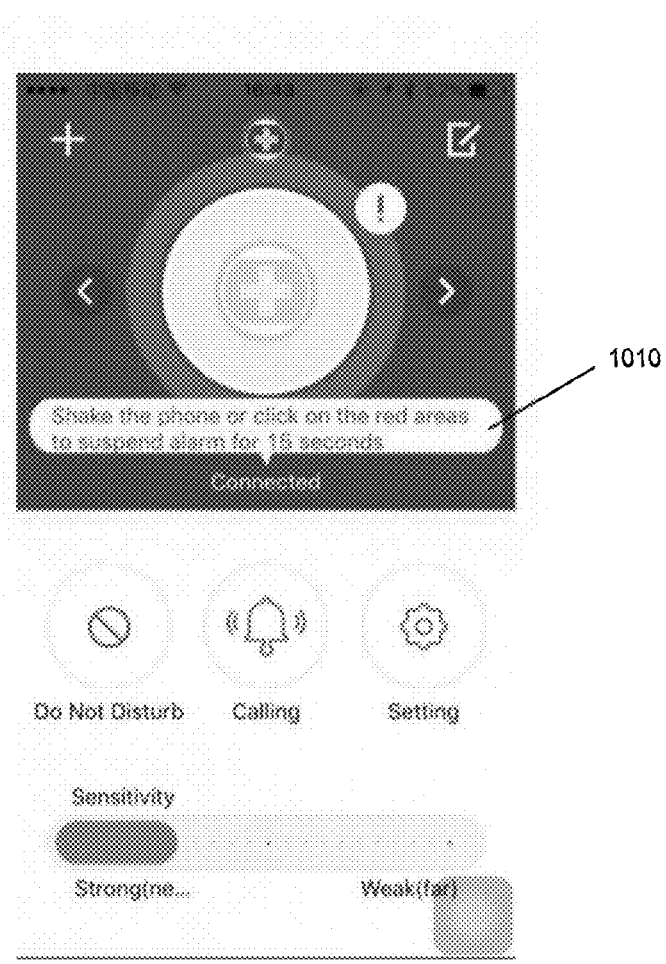
FIG. 17 depicts a screenshot of an application showing aspects of the present invention.
Figure 18:
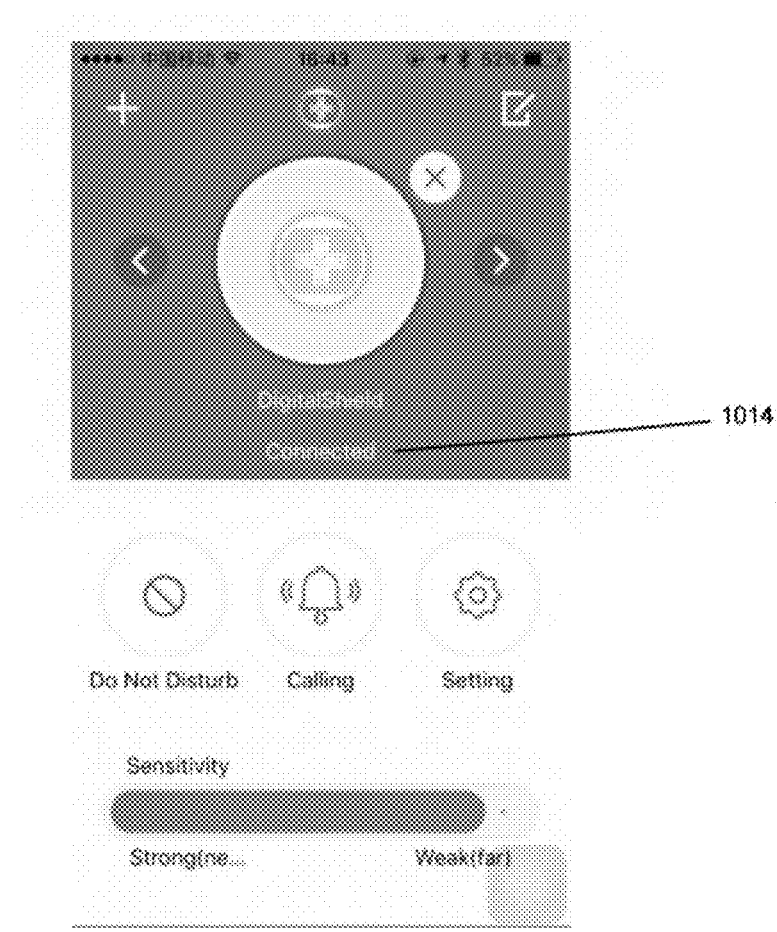
FIG. 18 depicts a screenshot of an application showing aspects of the present invention.
Figure 19:
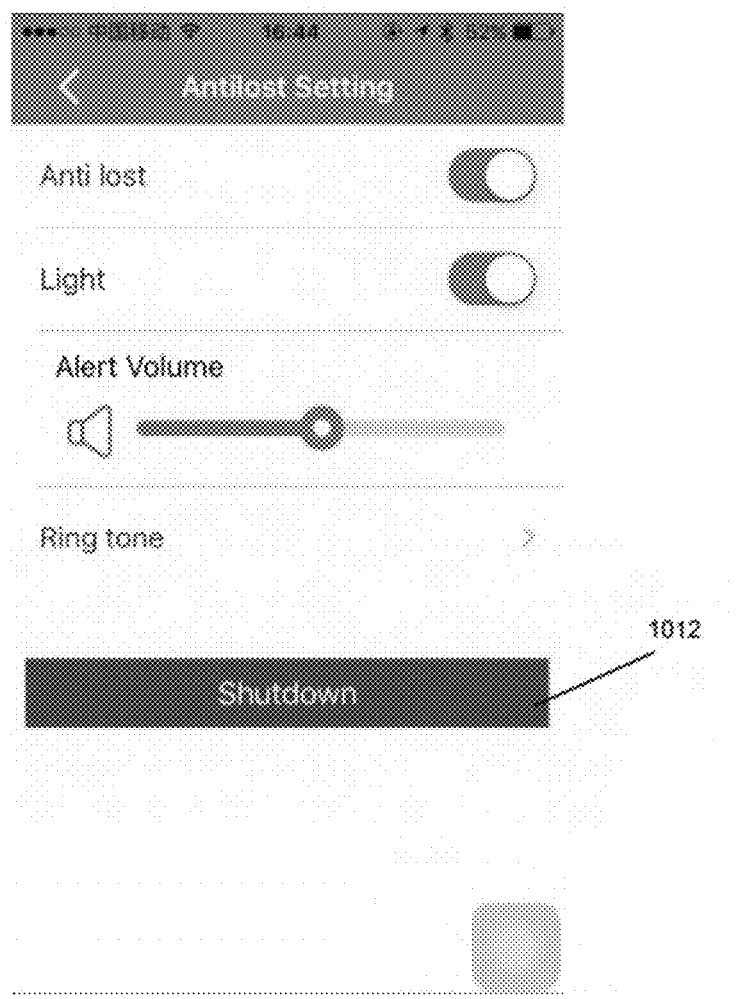
FIG. 19 depicts a screenshot of an application showing aspects of the present invention.
Figure 20:
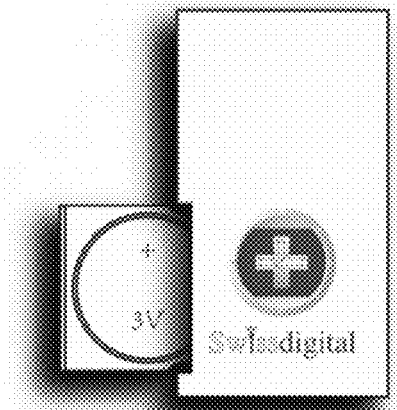
FIGS. 20, 21, 22, 23 and 24 depict a Bluetooth anti-lost communication device according to another aspect of the present invention.
Figure 21:
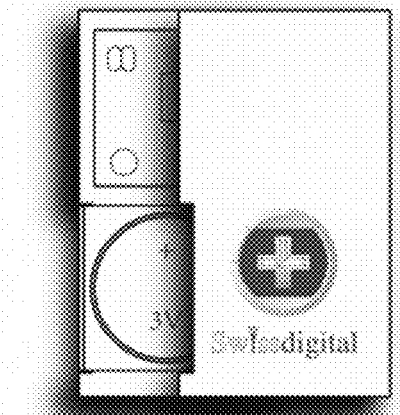
Figure 22:
Figure 23:
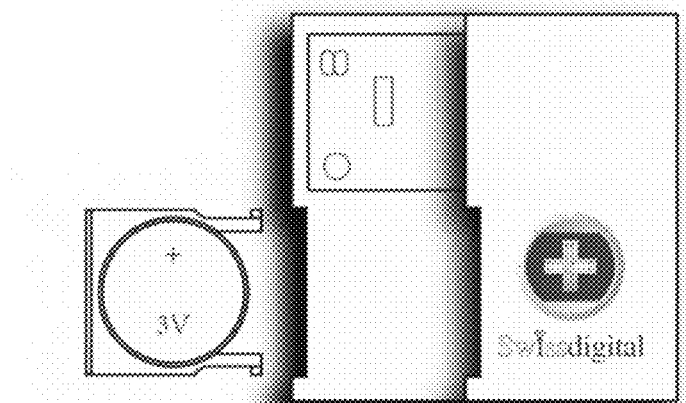
Figure 24:
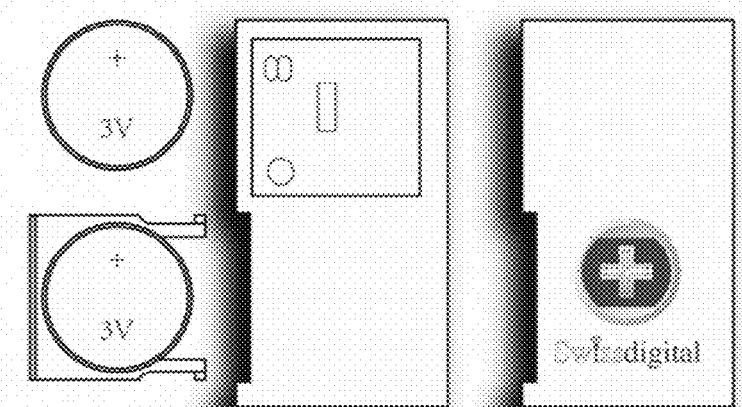

FIG. 6 depicts an embodiment which is still a backpack. It is similar to other embodiments. but the installation location of the base (3) is different. The base (3) is mounted inside a handle (12) of the bag or luggage body (1), a button hole (121) is provided on the handle (12), and the movable button (33) is exposed to outside of the button hole (121). The base (3) can be made from a flexible material. FIG. 7 depicts another embodiment, the installation location of the base (3) is different, wherein the base (3) is mounted inside a handle (12) of the bag or luggage body (1), a button indicator (122) is provided on the handle (12), and the movable button (33) is built in the bottom of the button indicator (122). The base (3) can be made from a flexible material. FIG. 7 depicts another embodiment, wherein the base (3) is mounted on a shoulder strap (14) of the bag or luggage body (1). FIG. 8 depicts another embodiment wherein the base (3) is mounted inside a surface fixed part (15) of a USB charging outlet of the shoulder strap (14).

According to one embodiment, the base (3) is a part of a nameplate (11) mounted on the bag, wallet or luggage body (1). Of course, the base (3) can also be manufactured as a part of other decorative part (13), and the decorative part (13) can be such parts as buckle, rubber decorative part and so on mounted on the bag body. Meanwhile, in each of above embodiments, the backpack can be replaced with a travel suitcase, which can also achieve the objective of the disclosure. FIGS. 2-5 show a structure of a Bluetooth anti-lost reminder component described in the disclosure, comprising a Wireless communication device (2) and a base (3), a recess (31) accommodating the Wireless communication device (2) and a rear cover (32) provided on the back of the base (3), and a movable button (33) further provided on the front of the base (3). The Wireless communication device (2) is mounted in a cavity formed by the recess (31) and the rear cover (32) of the base (3), and a switch button (21) of the Wireless communication device (2) is correspondingly disposed below the movable button (33) of the base (3). The base (3) is a part of the nameplate (11) or decorative part (13) that can be mounted on the product. The base (3) can be made from a flexible material. The recess (31) and the rear cover (32) are locked by the way of screw thread matching, or matched to lock by the way of fastening a buckle. The Bluetooth anti-lost component can be installed on the bag or luggage body described in each of above embodiments as required, and also can be installed and used on various other devices or articles that can be carried out, such as camping tents, sleeping bags, umbrellas, coats or others, to achieve the anti-lost reminding function.

The above specific embodiments are only explained in detail on technical solutions of the disclosure, and the disclosure is not limited only by above embodiments. Any improvement or replacement based on the principle of the disclosure shall fall within the protection scope of the disclosure.

I claim:

1. A system for precise location and tracking of a bag, wallet or luggage body, said system comprising:
    a bag, wallet or luggage body having an anti-lost communication device attached to the bag, wallet or luggage body, the anti-lost communication device comprising a wireless communication device; and
    an application on a mobile computing device in communication with the wireless communication device, wherein the application issues a reminder on the mobile computing device when it determines the wireless communication device is a predetermined distance from the mobile computing device or the wireless communication device has lost communication with the mobile computing device
    a base attached to the bag, wallet or luggage body, the base having a recess that receives the wireless communication device, a rear cover that contains the wireless communication device in the recess, a movable button on the front of the base, a switch button of the wireless communication device is correspondingly disposed below the movable button of the base,
    wherein a predetermined signal strength of the wireless communication device is set for an indoor signal strength adjustment and an outdoor signal strength outdoor adjustment.

2. A system as in claim 1, wherein the anti-lost communication device is attached to the bag, wallet or luggage body by sewn stitches.

3. A system as in claim 1, wherein the reminder on the mobile computing device is selected from the group consisting of an alarm, lights, flicker and vibration.

4. A system as in claim 1, wherein the reminder is issued, the reminder is reset by shaking the mobile computing device.

5. A system as in claim 1, wherein the application on the mobile computing device has a do not disturb button that prevents a reminder from being issued.

6. A system as in claim 5, wherein the do not disturb button is set for a do not disturb length of time that prevents the reminder from being issued for the do not disturb length of time.

7. A system as in claim 1, wherein the application has a shutdown function that remotely powers down the wireless communication device.

8. A system as in claim 1, wherein the application has a turn-on function that remotely powers up the wireless communication device.

9. A system as in claim 1, wherein the wireless communication device is selected from the group consisting of a bluetooth device, bluetooth sensor, Bluetooth LE sensors, antennas, WiFi, cell signal detection, radio frequency sensors, cell signal detection on LTE, cell signal detection on GSM, WCDMA, CDMA, WLAN, GPS and UWB.

10. A system as in claim 1, wherein said base is a part of a nameplate or a decorative part mounted on the bag or luggage body.

11. A system as in claim 1, wherein said base is mounted inside a handle of the luggage body, a button hole is provided on the handle and the movable button is exposed to outside of the button hole.

12. A system as in claim 1, wherein the base is mounted inside the handle of the luggage body, a button indicator is provided on the handle and the movable button is built in the bottom of the button indicator.

13. A system as in claim 1, wherein the base is made from a flexible material.

14. A system according to claim 1, wherein the base is mounted on a shoulder strap of the luggage body, or mounted inside a surface base of a USB charging outlet of the shoulder strap.

15. A system according to claim 1, wherein the recess and rear cover are locked by the way of screw thread matching, or matched to lock by the way of fastening a buckle.

16. A system according to claim 1, wherein the application has a sensitivity adjustment and controls for the wireless communication device, and the application issues a reminder on the mobile computing device when it determines the wireless communication device is at a predetermined distance, as set by the sensitivity adjustment, from the mobile computing device.

17. A system according to claim 1, wherein the application has a distance adjustment and controls for the wireless communication device, and the application issues a reminder on the mobile computing device when it determines the wireless communication device is at a predetermined distance, as set by the distance adjustment, from the mobile computing device.

18. A system according to claim 1, wherein the application has a signal strength adjustment and controls for the wireless communication device, and the application issues a reminder on the mobile computing device when it determines the wireless communication device is at a predetermined signal strength, as set by the strength adjustment, from the mobile computing device.

19. A system according to claim 1, wherein the application has an indoor and outdoor adjustment and controls for the wireless communication device, and the application issues a reminder on the mobile computing device when it determines the wireless communication device is at a predetermined signal strength, as set by the indoor and outdoor adjustment, from the mobile computing device.

\* \* \* \* \*